(12) United States Patent
DeBie

(10) Patent No.: US 8,930,251 B2
(45) Date of Patent: *Jan. 6, 2015

(54) DEBT TRENDING SYSTEMS AND METHODS

(75) Inventor: Tod DeBie, Irvine, CA (US)

(73) Assignee: Consumerinfo.com, Inc., Costa Mesa, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 13/345,319

(22) Filed: Jan. 6, 2012

(65) Prior Publication Data

US 2012/0136768 A1    May 31, 2012

Related U.S. Application Data

(63) Continuation of application No. 12/487,155, filed on Jun. 18, 2009, now Pat. No. 8,095,443.

(60) Provisional application No. 61/073,478, filed on Jun. 18, 2008.

(51) Int. Cl.
*G06Q 40/00* (2012.01)

(52) U.S. Cl.
USPC .............................................. 705/35; 705/40

(58) Field of Classification Search
USPC ...................................... 705/10–44
See application file for complete search history.

(56) References Cited

U.S. PATENT DOCUMENTS

| | | | |
|---|---|---|---|
| 4,346,442 A | 8/1982 | Musmanno | |
| 4,774,664 A * | 9/1988 | Campbell et al. | ............... 705/38 |
| 5,500,513 A | 3/1996 | Langhans et al. | |
| 5,590,038 A | 12/1996 | Pitroda | |
| 5,640,577 A | 6/1997 | Scharmer | |
| 5,649,114 A | 7/1997 | Deaton et al. | |
| 5,844,218 A | 12/1998 | Kawan et al. | |
| 5,903,830 A | 5/1999 | Joao et al. | |
| 5,903,881 A | 5/1999 | Schrader et al. | |
| 5,940,812 A | 8/1999 | Tengel et al. | |
| 5,950,179 A | 9/1999 | Buchanan et al. | |
| 5,956,693 A | 9/1999 | Geerlings | |
| 5,970,478 A | 10/1999 | Walker et al. | |
| 5,999,596 A | 12/1999 | Walker et al. | |
| 6,021,943 A | 2/2000 | Chastain | |
| 6,038,551 A | 3/2000 | Barlow et al. | |

(Continued)

FOREIGN PATENT DOCUMENTS

| | | |
|---|---|---|
| JP | 10-222559 | 8/1998 |
| JP | 10-261009 | 9/1998 |

(Continued)

OTHER PUBLICATIONS

U.S. Appl. No. 12/705,489, Feb. 12, 2010, Bargoli et al.

(Continued)

*Primary Examiner* — Frantzy Poinvil
(74) *Attorney, Agent, or Firm* — Knobbe, Martens, Olson & Bear LLP

(57) ABSTRACT

A debt trending device accesses credit reports and/or other financial data that is available from one or more financial data sources, for a user and extracts financial account information. The debt trending device may then analyze the account information in order to generate debt trending information that indicates in the form of lists, tables, graphs, charts, etc., information regarding multiple debt accounts associated with the user.

24 Claims, 9 Drawing Sheets

(56) References Cited

U.S. PATENT DOCUMENTS

| | | |
|---|---|---|
| 6,064,990 A | 5/2000 | Goldsmith |
| 6,128,602 A | 10/2000 | Northington et al. |
| 6,144,948 A | 11/2000 | Walker et al. |
| 6,202,053 B1 | 3/2001 | Christiansen et al. |
| 6,233,566 B1 | 5/2001 | Levine et al. |
| 6,304,860 B1 | 10/2001 | Martin et al. |
| 6,343,279 B1 | 1/2002 | Bissonette et al. |
| 6,374,230 B1 | 4/2002 | Walker et al. |
| 6,456,979 B1 | 9/2002 | Flagg |
| 6,513,018 B1 | 1/2003 | Culhane |
| 6,532,450 B1 | 3/2003 | Brown et al. |
| 6,801,909 B2 | 10/2004 | Delgado et al. |
| 6,804,346 B1 | 10/2004 | Mewhinney |
| 6,901,406 B2 | 5/2005 | Nabe et al. |
| 6,910,624 B1 | 6/2005 | Natsuno |
| 6,934,714 B2 | 8/2005 | Meinig |
| 6,968,319 B1 | 11/2005 | Remington et al. |
| 6,985,887 B1 | 1/2006 | Sunstein et al. |
| 7,028,052 B2 | 4/2006 | Chapman et al. |
| 7,039,607 B2 | 5/2006 | Watarai et al. |
| 7,047,251 B2 | 5/2006 | Reed et al. |
| 7,072,909 B2 | 7/2006 | Polk |
| 7,136,448 B1 | 11/2006 | Venkataperumal et al. |
| 7,184,974 B2 | 2/2007 | Shishido |
| 7,236,950 B2 | 6/2007 | Savage et al. |
| 7,249,048 B1 | 7/2007 | O'Flaherty |
| 7,249,113 B1 | 7/2007 | Continelli et al. |
| 7,281,652 B2 | 10/2007 | Foss |
| 7,330,835 B2 | 2/2008 | Deggendorf |
| 7,343,295 B2 | 3/2008 | Pomerance |
| 7,367,011 B2 | 4/2008 | Ramsey et al. |
| 7,373,324 B1 | 5/2008 | Engin et al. |
| 7,376,603 B1 | 5/2008 | Mayr et al. |
| 7,386,511 B2 | 6/2008 | Buchanan et al. |
| 7,451,095 B1 | 11/2008 | Bradley et al. |
| 7,451,113 B1 | 11/2008 | Kasower |
| 7,529,698 B2 | 5/2009 | Joao |
| 7,536,329 B2 * | 5/2009 | Goldberg et al. ............... 705/35 |
| 7,536,348 B2 | 5/2009 | Shao et al. |
| 7,542,993 B2 | 6/2009 | Satterfield et al. |
| 7,543,739 B2 | 6/2009 | Brown et al. |
| 7,552,089 B2 | 6/2009 | Bruer et al. |
| 7,596,512 B1 | 9/2009 | Raines et al. |
| 7,647,274 B2 | 1/2010 | Peterson et al. |
| 7,672,865 B2 | 3/2010 | Kumar et al. |
| 7,689,505 B2 | 3/2010 | Kasower |
| 7,693,787 B2 | 4/2010 | Provinse |
| 7,698,163 B2 | 4/2010 | Reed et al. |
| 7,707,059 B2 | 4/2010 | Reed et al. |
| 7,725,300 B2 | 5/2010 | Pinto et al. |
| 7,725,385 B2 | 5/2010 | Royer et al. |
| 7,747,559 B2 | 6/2010 | Leitner et al. |
| 7,765,148 B2 | 7/2010 | German et al. |
| 7,797,252 B2 | 9/2010 | Rosskamm et al. |
| 7,848,978 B2 * | 12/2010 | Imrey et al. ..................... 705/35 |
| 7,849,004 B2 | 12/2010 | Choudhuri et al. |
| 7,853,493 B2 | 12/2010 | DeBie et al. |
| 7,860,786 B2 | 12/2010 | Blackburn et al. |
| 7,899,750 B1 | 3/2011 | Klieman et al. |
| 7,930,242 B2 | 4/2011 | Morris et al. |
| 7,966,192 B2 | 6/2011 | Pagliari et al. |
| 7,974,860 B1 | 7/2011 | Travis |
| 7,991,689 B1 | 8/2011 | Brunzell et al. |
| 8,001,042 B1 | 8/2011 | Brunzell et al. |
| 8,001,043 B1 | 8/2011 | Walker et al. |
| 8,005,759 B2 | 8/2011 | Hirtenstein et al. |
| 8,036,979 B1 | 10/2011 | Torrez et al. |
| 8,065,233 B2 | 11/2011 | Lee et al. |
| 8,078,527 B2 | 12/2011 | Cerise et al. |
| 8,078,528 B1 | 12/2011 | Vicente et al. |
| 8,095,443 B2 | 1/2012 | DeBie |
| 8,095,458 B2 | 1/2012 | Peterson et al. |
| 8,099,356 B2 | 1/2012 | Feinstein et al. |
| 8,127,986 B1 | 3/2012 | Taylor et al. |
| 8,280,805 B1 | 10/2012 | Abrahams et al. |
| 8,290,840 B2 | 10/2012 | Kasower |
| 8,290,856 B1 | 10/2012 | Kasower |
| 8,296,229 B1 | 10/2012 | Yellin et al. |
| 8,301,574 B2 | 10/2012 | Kilger et al. |
| 8,315,943 B2 | 11/2012 | Torrez et al. |
| 8,392,334 B2 | 3/2013 | Hirtenstein et al. |
| 8,464,939 B1 | 6/2013 | Taylor et al. |
| 8,595,101 B1 | 11/2013 | Daukas et al. |
| 8,639,920 B2 | 1/2014 | Stack et al. |
| 2001/0037289 A1 | 11/2001 | Mayr et al. |
| 2001/0044729 A1 | 11/2001 | Pomerance |
| 2002/0026394 A1 | 2/2002 | Savage et al. |
| 2002/0069122 A1 | 6/2002 | Yun et al. |
| 2002/0077964 A1 | 6/2002 | Brody et al. |
| 2002/0099628 A1 | 7/2002 | Yakaoka et al. |
| 2002/0128962 A1 | 9/2002 | Kasower |
| 2002/0169747 A1 | 11/2002 | Chapman et al. |
| 2002/0194120 A1 | 12/2002 | Russell et al. |
| 2003/0009418 A1 | 1/2003 | Green et al. |
| 2003/0018578 A1 | 1/2003 | Schultz |
| 2003/0069839 A1 | 4/2003 | Whittington et al. |
| 2003/0097342 A1 | 5/2003 | Whittingtom |
| 2003/0105728 A1 | 6/2003 | Yano et al. |
| 2003/0212654 A1 | 11/2003 | Harper et al. |
| 2003/0219709 A1 | 11/2003 | Olenick et al. |
| 2003/0233278 A1 | 12/2003 | Marshall |
| 2004/0023637 A1 | 2/2004 | Johnson et al. |
| 2004/0039688 A1 | 2/2004 | Sulkowski et al. |
| 2004/0044563 A1 | 3/2004 | Stein |
| 2004/0128150 A1 | 7/2004 | Lundegren |
| 2004/0177035 A1 | 9/2004 | Silva |
| 2004/0220865 A1 | 11/2004 | Lozowski et al. |
| 2004/0230534 A1 | 11/2004 | McGough |
| 2004/0236688 A1 | 11/2004 | Bozeman |
| 2005/0251474 A1 | 11/2005 | Shinn et al. |
| 2005/0279827 A1 | 12/2005 | Mascavage et al. |
| 2005/0288998 A1 | 12/2005 | Verma et al. |
| 2006/0031158 A1 | 2/2006 | Orman |
| 2006/0036543 A1 | 2/2006 | Blagg et al. |
| 2006/0085334 A1 | 4/2006 | Murphy |
| 2006/0106670 A1 | 5/2006 | Cai et al. |
| 2006/0178971 A1 | 8/2006 | Owen et al. |
| 2006/0223043 A1 | 10/2006 | Dancy-Edwards et al. |
| 2006/0242048 A1 | 10/2006 | Haggerty et al. |
| 2007/0094137 A1 | 4/2007 | Phillips et al. |
| 2007/0112668 A1 | 5/2007 | Celano et al. |
| 2007/0124235 A1 | 5/2007 | Chakraborty et al. |
| 2007/0168246 A1 | 7/2007 | Haggerty et al. |
| 2007/0208729 A1 | 9/2007 | Martino |
| 2007/0226047 A1 | 9/2007 | Ward |
| 2007/0262140 A1 | 11/2007 | Long, Sr. |
| 2007/0288360 A1 | 12/2007 | Seeklus |
| 2008/0046383 A1 | 2/2008 | Hirtenstein et al. |
| 2008/0052182 A1 | 2/2008 | Marshall |
| 2008/0059224 A1 | 3/2008 | Schechter |
| 2008/0059352 A1 | 3/2008 | Chandran |
| 2008/0091519 A1 | 4/2008 | Foss |
| 2008/0103959 A1 | 5/2008 | Carroll et al. |
| 2008/0133325 A1 | 6/2008 | De et al. |
| 2008/0154766 A1 * | 6/2008 | Lewis et al. ..................... 705/38 |
| 2008/0172324 A1 | 7/2008 | Johnson |
| 2008/0221970 A1 | 9/2008 | Megdal et al. |
| 2008/0221972 A1 | 9/2008 | Megdal et al. |
| 2008/0221990 A1 | 9/2008 | Megdal et al. |
| 2008/0222027 A1 | 9/2008 | Megdal et al. |
| 2008/0228556 A1 | 9/2008 | Megdal et al. |
| 2008/0270209 A1 | 10/2008 | Mauseth et al. |
| 2008/0294501 A1 | 11/2008 | Rennich et al. |
| 2008/0301016 A1 | 12/2008 | Durvasula et al. |
| 2009/0024484 A1 | 1/2009 | Walker et al. |
| 2009/0024505 A1 | 1/2009 | Patel et al. |
| 2009/0030776 A1 | 1/2009 | Walker et al. |
| 2009/0076883 A1 | 3/2009 | Kilger et al. |
| 2009/0089190 A1 | 4/2009 | Girulat |
| 2009/0164380 A1 | 6/2009 | Brown |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |

(56) References Cited

U.S. PATENT DOCUMENTS

| | | |
|---|---|---|
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0271248 A1 | 10/2009 | Sherman et al. |
| 2009/0276233 A1 | 11/2009 | Brimhall et al. |
| 2010/0010935 A1 | 1/2010 | Shelton |
| 2010/0023448 A1 | 1/2010 | Eze |
| 2010/0114724 A1 | 5/2010 | Ghosh et al. |
| 2010/0169159 A1 | 7/2010 | Rose et al. |
| 2010/0250434 A1 | 9/2010 | Megdal et al. |
| 2011/0047071 A1 | 2/2011 | Choudhuri et al. |
| 2011/0060905 A1 | 3/2011 | Stack et al. |
| 2011/0093383 A1 | 4/2011 | Haggerty et al. |
| 2011/0112958 A1 | 5/2011 | Haggerty et al. |
| 2011/0145122 A1 | 6/2011 | Haggerty et al. |
| 2011/0166988 A1 | 7/2011 | Coulter |
| 2011/0184838 A1 | 7/2011 | Winters et al. |
| 2011/0251946 A1 | 10/2011 | Haggerty et al. |
| 2012/0011158 A1 | 1/2012 | Avner et al. |
| 2012/0022990 A1 | 1/2012 | Kasower |
| 2012/0095927 A1 | 4/2012 | Hirtenstein et al. |
| 2012/0136768 A1 | 5/2012 | DeBie |
| 2012/0158574 A1 | 6/2012 | Brunzell et al. |
| 2012/0317016 A1 | 12/2012 | Hughes |
| 2013/0080315 A1 | 3/2013 | Torrez et al. |
| 2013/0110557 A1 | 5/2013 | Kasower |
| 2013/0173481 A1 | 7/2013 | Hirtenstein et al. |
| 2013/0218638 A1 | 8/2013 | Kilger et al. |
| 2014/0032265 A1 | 1/2014 | Paprocki et al. |

FOREIGN PATENT DOCUMENTS

| | | |
|---|---|---|
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| WO | WO 01/84281 | 11/2001 |
| WO | WO 2008/022289 | 2/2008 |
| WO | WO 2008/076343 | 6/2008 |
| WO | WO 2008/147918 | 12/2008 |
| WO | WO 2010/132492 | 11/2010 |
| WO | WO 2014/018900 | 1/2014 |

OTHER PUBLICATIONS

U.S. Appl. No. 12/705,511, Feb. 12, 2010, Bargoli et al.
Announcing TrueProfiler, http://web.archive.org/web/20021201123646/http://www.truecredit.com/index.asp, dated Dec. 1, 2002, 2 pages.
Anonymous; "Credit-Report Disputes Await Electronic Resolution"; Credit Card News; Chicago: Jan. 15, 1993; vol. 5, Issue 19; p. 5.
Anonymous; "MBNA Offers Resolution of Credit Card Disputes"; Hempstead: Feb. 2002; vol. 68, Issue 2; p. 47.
Caliendo, et al.; "Some Practical Guidance for the Implementation of Propensity Score Matching"; IZA: Discussion Paper Series; No. 1588; Germany; May 2005.
Ettorre, Paul Kahn on Exceptional Marketing. Management Review, vol. 38(11), Nov. 1994, pp. 48-51.
Experian-Scorex Announces New Credit Simulation Tool, PR Newswire, Costa Mesa, CA, Jun. 13, 2005.
Fanelli, Marc; "Building a Holistic Customer View"; MultiChannel Merchant; pp. 2; Jun. 26, 2006.
Ideon, Credit-Card Registry that Bellyflopped this Year, Is Drawing some Bottom-Fishers, The Wall Street Journal, Aug. 21, 1995, pp. C2.
Instant Access to Credit Reports Now Available Online with DMS' CreditBrowser-based system also Simplifies Credit Decisioning and Offers a Central Point of Control, Business Wire, p. 0264, Dallas, May 23, 2000.
"Intelligent Miner Applications Guide"; Chapters 4-7; pp. 33-132; IBM Corp., Apr. 2, 1999.
"Japan's JAAI system appraises used cars over internet", Asia Pulse Mar. 3, 2000.
Lamons, Bob, Be Smart: Offer Inquiry Qualification Services, Marketing News, vol. 29, Issue 23, ABI/Inform Global, p. 13, Nov. 6, 1995.
Magid, Lawrence, J., Business Tools: When Selecting an ASP Ensure Data Mobility, Los Angeles Times, Feb. 26, 2001, vol. C, Issue 4, pp. 3, Los Angeles, CA.
Miller, Joe, "NADA Used-Car Prices go Online". Automotive News, p. 36, Jun. 14, 1999.
SalesLogix.net, SalesLogix Sales Tour, Apr. 2000, http://web.archive.org/web/20010411115938/www.saleslogix.com/home/index.php3celli . . . as printed on Aug. 30, 2005, 19 Pgs.
Sawyers, Arlene "NADA to Offer Residual Guide", Automotive News, p. 3, May 22, 2000.
Stein, Benchmarking Default Prediction Models: Pitfalls and Remedies in Model Validation, Moody's KMV, Revised Jun. 13, 2002, Technical Report #020305; New York.
Tao, Lixin; "Shifting Paradigms with the Application Service Provider Model"; Concordia University, Canada; IEEE; Oct. 2001.
Thoemmes, Felix, "Propensity Score Matching in SPSS", Center for Educational Science and Psychology, University of Tübingen, Jan. 2012.
"WashingtonPost.com and Cars.com launch comprehensive automotive web site for the Washington area". PR Newswire, Oct. 22, 1998.
BBC Green Home, "My Action Plan", http://web.archive.org/web/20080513014731/http://www.bbcgreen.com/actionplan printed May 13, 2008 in 50 pages.
Berr: Department for Business Enterprise & Regulatory Reform, "Regional Energy Consumption Statistics", Jun. 10, 2008, http://webarchive.nationalarchives.gov.uk/20080610182444/http://www.berr.gov.uk/energy/statistics/regional/index.html.
"Carbon Calculator—Calculation Explanation," Warwick University Carbon Footprint Project Group, 2005, pp. 5, http://www.carboncalculator.co.uk/explanation.php.
Energy Saving TrustTM, "HEED Online User Manual (1.7)", Jul. 24, 2008, pp. 18, www.energysavingtrust.org.uk, Jul. 24, 2008.
Jowit, Juliette, "Ever wondered how big your own carbon footprint might be?", Nov. 4, 2007, pp. 4, http://www.guardian.co.uk/money/2007/nov/04/cash.carbonfootprints/print.
Wiedmann, et al., "Report No. 2: The use of input-output analysis in REAP to allocate Ecological Footprints and material flows to final consumption categories", Resources and Energy Analysis Programme, Stockholm Environment Institute—York, Feb. 2005, York, UK, pp. 33.
Pagano, et al., "Information Sharing in Credit Markets," Dec. 1993, The Journal of Finance, vol. 48, No. 5, pp. 1693-1718.

* cited by examiner

DEBT TRENDING SYSTEMS AND METHODS

CROSS-REFERENCE TO RELATED APPLICATIONS

This application claims priority to, and is a continuation of, U.S. application Ser. No. 12/487,155 filed Jun. 18, 2009, now U.S. Pat. No. 8,095,443, which claims priority to U.S. Provisional Application No. 61/073,478, filed Jun. 18, 2008, and entitled "Debt Trending System and Method," both of which are hereby incorporated by reference in their entirety for all purposes.

BACKGROUND OF THE INVENTION

1. Field of the Invention

The invention relates to systems and methods for generating debt trending information, such as information regarding multiple debts of a user.

2. Description of the Related Art

Typical consumers have multiple debt accounts, such as credit card, mortgage, and loan accounts. These accounts have varying payments, interest rates, and maturity dates that make it difficult for a consumer to visualize how their overall debt situations, e.g., a total of all debts, has changed over previous months and/or to estimate how the overall debt situation will change in the future. Additionally, compiling debt information associated with multiple accounts requires the consumer to remember all of the accounts that they have opened and manually compile all of their account information, such as by locating statements associated with the various accounts and copying account information into a personal finance software application.

SUMMARY OF THE INVENTION

In one embodiment, a computing system for providing information associated with a plurality of consumer debts comprises a financial data integration module configured to retrieve financial data associated with a user, wherein the financial data comprises at least a credit report of the user, the financial data integration module being further configured to extract account information regarding each of a plurality of debt accounts associated with the user from the financial data, wherein the debt accounts are selected from the group comprising at least credit card, mortgage, automobile loan, and personal loan, and the account information for at least some of the debt accounts comprises one or more of an outstanding balance and a monthly payment amount, a debt trending module configured to generate a user interface comprising information that is based on at least the account information for at least some of the debt accounts, the user interface indicating at least a total debt for each of a plurality of previous months based on calculated sums of outstanding balances for each of the plurality of debt accounts at the respective previous month, and a total debt estimate for one or more future months based on calculated sums of estimated outstanding balances for each of the plurality of debt accounts at the respective future month.

In one embodiment, a method of providing debt information for a plurality of debt accounts associated with a user comprises receiving consumer information identifying a consumer, the consumer information comprising at least one of a consumer's name, social security number, and residence address, transmitting at least some of the consumer information to a credit data source, receiving credit information associated with the consumer from the credit data source, detecting one or more financial accounts in the received credit information, the financial accounts selected from the group comprising at least credit card and loan accounts, determining account information associated with each of the detected financial accounts, wherein the account information comprises one or more of an outstanding balance, a periodic minimum payment amount, an interest rate, and a payoff date, determining estimated outstanding balances and/or periodic minimum payment amounts for one or more future periods for each of one or more financial accounts, and determining total estimated outstanding balances and/or total periodic minimum payment amounts based on the determined outstanding balances and/or periodic minimum payment amounts for each of the one or more financial accounts.

In one embodiment, a method of providing information associated with a plurality of consumer debts comprises accessing financial data associated with a user, wherein the financial data comprises at least a credit report of the user, identifying account information regarding each of a plurality of debt accounts associated with the user from the financial data, and generating a user interface comprising information regarding a total debt for each of a plurality of previous months based at least on calculated sums of outstanding balances for each of the plurality of debt accounts at the respective previous month as determined from at least the identified account information, the user interface further comprising information regarding total debt estimate for one or more future months based on calculated sums of estimated outstanding balances for each of the plurality of debt accounts at the respective future month.

In one embodiment, a computer-readable storage medium contains a set of instructions that, if executed by a computing system, causes the computing system to perform a method comprising accessing financial data associated with a user, wherein the financial data comprises at least a credit report of the user, identifying account information regarding each of a plurality of debt accounts associated with the user from the financial data, and based at least on the identified account information, generating a user interface comprising information regarding a total debt for each of a plurality of previous months based at least on calculated sums of outstanding balances for each of the plurality of debt accounts at the respective previous month, the user interface further comprising information regarding total debt estimates for one or more future months based on calculated sums of estimated outstanding balances for each of the plurality of debt accounts at the respective future month.

In one embodiment, a method of determining estimated debt information for each of a plurality of debt accounts associated with a consumer comprises receiving at a consumer computing device account information associated with each of a plurality of debt accounts associated with the user from a debt trending device, wherein the debt trending device is configured to extract the account information from at least a credit report of the consumer and based at least on the received account information, generating a user interface comprising information regarding estimated total debt for one or more future months based on calculated sums of estimated outstanding balances for each of the plurality of debt accounts at the respective future month.

DETAILED DESCRIPTION

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the disclosure described herein.

Figure 1A:
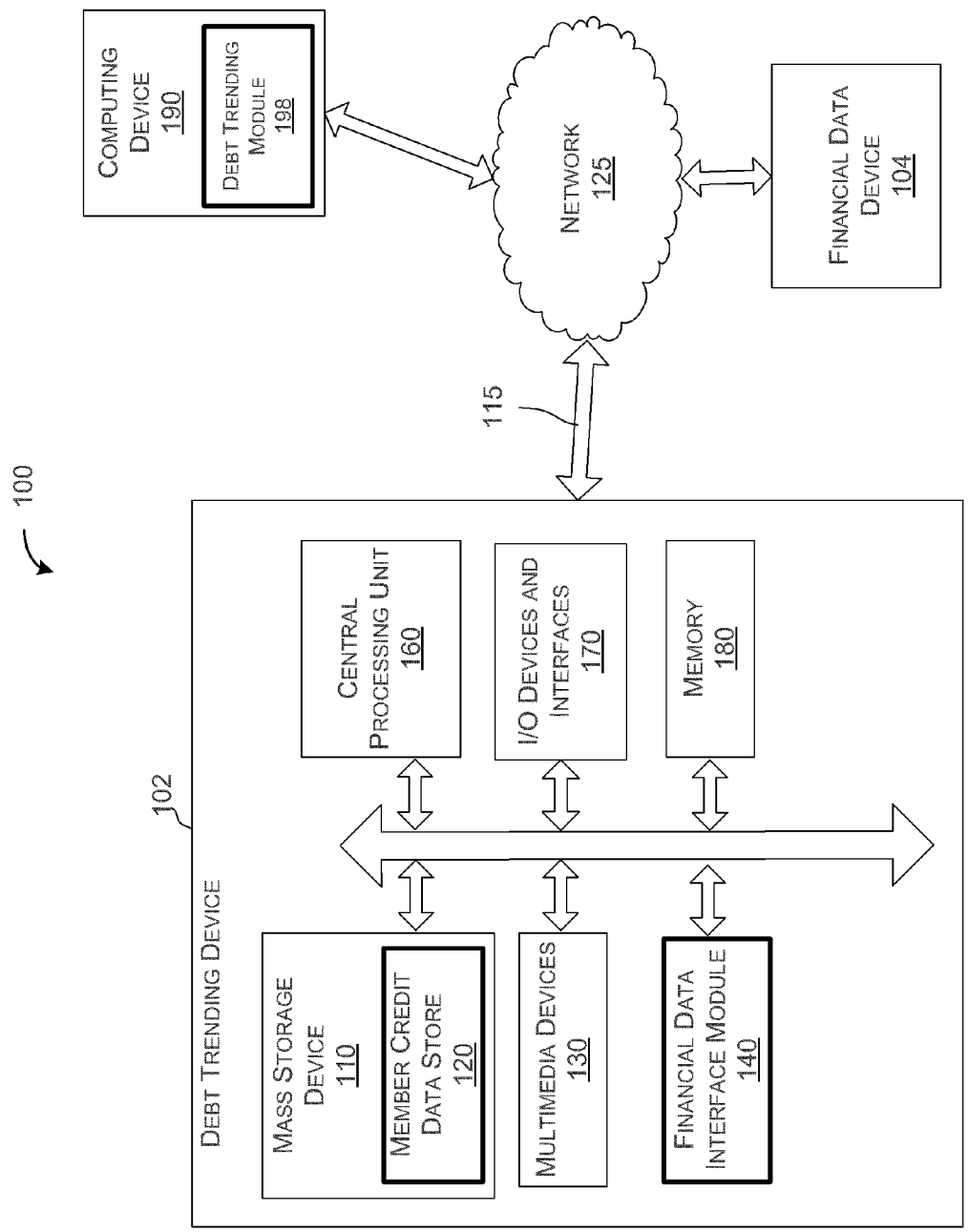
FIG. 1A is a block diagram illustrating one embodiment of a debt trending device coupled to a network in communication with a computing device executing a debt trending module.

FIG. 1A is a block diagram illustrating one embodiment of a debt trending device 102 coupled to a network 125 in communications with a computing device 190 executing a debt trending module 198. In the embodiment of FIG. 1A, the debt trending device 102 is also in communication with a financial data device 104 that is configured to provide financial data regarding users to the debt trending device 102, such as in the format of a credit report. The debt trending device 102 may also communicate with one or more other financial information devices in order to retrieve financial data.

In one embodiment, the debt trending module 198 utilizes existing credit bureau data (and/or other financial data associated with individuals, couples, households, etc.) to chart user debt over time. In another embodiment, the debt trending module 198 may aggregate all account balances found on a single or a combination of credit reports (and/or other financial data) and chart total debt owed by one or more users. One benefit to the user is the ability to trace their respective debt history and allow the user the ability to estimate debt balances for the future. As used herein, the term "user" may include an individual, multiple individuals, a married couple, a family, a business, or any other entity. In the embodiment of FIG. 1A, the debt trending device 102 communicates with the computing device 190 and the financial data device 104 via a network 125, which may comprise any combination of one or more wireless and/or wired networks, such as LANs, WANs, and/or the internet.

In one embodiment, the debt trending module 198 may be configured to communicate with the debt trending device 102 in order to enroll a user into a debt trending account that allow the user to receive data regarding currently open financial accounts and/or to receive periodic updates of new financial accounts that may be identified in the user's credit report, among other features. In one embodiment, the computing device 190 utilizes the debt trending module 198 to request and retrieve financial information related to the user, whereby financial information may include any available financial data, such as credit data, for example.

In general, a module, as used herein, refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. Generally, the modules described herein refer to logical modules that may be combined with other modules or divided into sub-modules despite their physical organization or storage. Additionally, the functionality provided for in the modules described herein may be combined into fewer components and modules or further separated into additional components and modules. Components or modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In one embodiment, the debt trending device 102 includes, for example, one or more servers or computers that are IBM, Macintosh, or Linux/Unix compatible. In another embodiment, the debt trending device 102 comprises one or more laptop computer, cellular phone, personal digital assistant, kiosk, or audio player, for example. In one embodiment, the exemplary debt trending device 102 includes a central processing unit ("CPU") 160, which may include a conventional microprocessor. The debt trending device 102 further includes a memory 180, such as random access memory ("RAM") for temporary storage of information and a read only memory ("ROM") for permanent storage of information, and a mass storage device 110, such as a hard drive, diskette, or optical media storage device. Member credit data store 120 is stored in the mass storage device 110. In one embodiment, the member credit data store 120 may be financial information that has been retrieved, analyzed, and distributed to the end user's computing device 190. The member credit data store 120 may also include financial information that has been retrieved, un-analyzed, and/or pending for processing by the financial data interface module 140.

The debt trending device 102 is generally controlled and coordinated by operating system software, such as the Windows 95, 98, NT, 2000, XP, 7, Linux, SunOS, Solaris, PalmOS, Blackberry OS, or other compatible operating systems. In Macintosh systems, the operating system may be any available operating system, such as MAC OS X. In other embodiments, the debt trending device 102 may be controlled by a proprietary operating system. Conventional operating systems control and schedule computer processes for execution, perform memory management, provide file system, networking, and I/O services, and provide a user interface, such as a graphical user interface ("GUI"), among other things.

The exemplary debt trending device 102 includes one or more commonly available input/output (I/O) devices and interfaces 170, such as a keyboard, mouse, touchpad, and printer. In one embodiment, the I/O devices and interfaces 170 include one or more display device, such as a monitor, that allows the visual presentation of data to a user. More particularly, a display device provides for the presentation of GUIs, application software data, and multimedia presentations, for example. The debt trending device 102 may include one or more multimedia devices 130, such as speakers, video cards, graphics accelerators, microphones, etc., for example.

In the embodiment of FIG. 1A, the I/O devices and interfaces 170 provide a communication interface to various external devices. For example, the debt trending device 102 is in communication with a network 125, which comprises any combination of one or more LANs, WANs, or the Internet, for example, via a wired, wireless, or combination of wired and wireless communication links. The network 125 facilitates communications between various computing devices and/or other electronic devices via wired or wireless communication links. In the exemplary embodiment of FIG. 1A, the network 125 is in communication with computing device 190, such as desktop, laptop, or mobile computing devices.

In the embodiment of FIG. 1A, the debt trending device 102 may include a financial data interface module 140 that may be executed by the central processing unit (CPU) 160. In one embodiment, the financial data interface module 140 retrieves credit reports, and/or other financial data associated with users from the financial data device 104 and/or other financial information sources. The financial data device 104 may be associated and/or controlled by a credit bureau, a bank, a lender, a government agency, and/or any other entity. In one embodiment, the financial data interface module extracts financial account information from the financial data, such as from one or more credit reports. For example, the financial data device 104 may parse some or all of the financial data using search strings, such as regular expressions, that are configured to indentify account information in the financial data. Depending on the embodiment, account information may include any data associated with a financial account, such as a credit card, debit, checking, savings, brokerage, mortgage, loan, or other account. For example, account information may indicate account numbers, account holder(s), financial institutions, balances, transaction data, transaction summaries, etc., regarding respective financial accounts.

The financial data interface module 140 may be further configured to format the account information into a format that is usable by the debt trending module 198 and communicates the account information to the debt trending module 198. Accordingly, the debt trending module 198 is provided with information regarding each of a plurality of financial accounts that are associated with the user so that the debt trending module may generate one or more reports representative of past, current, and/or projected debt obligations of the user, for example. In other embodiments, the debt trending module 198 may provide the user with any number of additional debt trending analysis data.

Figure 1B:
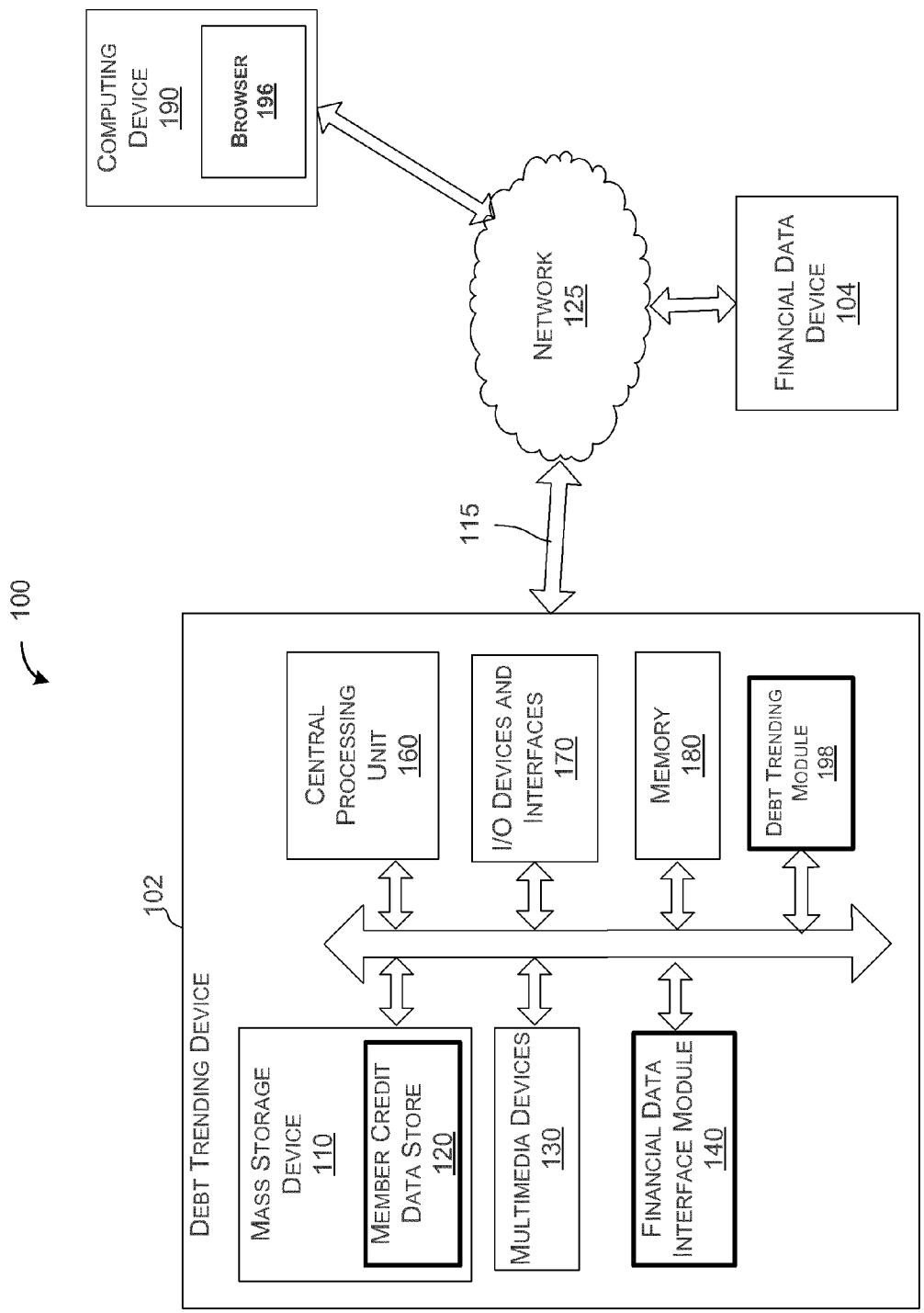
FIG. 1B is a block diagram illustrating another embodiment of a debt trending device that includes the debt trending module.

FIG. 1B is a block diagram illustrating another embodiment of the debt trending device 102, wherein the debt trending device 102 comprises the debt trending module 198 and the computing device 190 accesses data from the debt trending device 102 via a browser 196. For example, the computing device 190 may utilize the browser 196 in order to request and receive debt trending data from the debt trending module 198. In other embodiments, the computing device 190 may access the data from the debt trending module 198 via other software applications, such as standalone software applications, plugins/add-ins to software applications, or via command line interfaces, for example. The data from the debt trending device 102 may be in any suitable format, such as in one or more Hypertext Markup Language (HTML), eXtendible markup language (XML), comma separated values (CSV), or other format. The financial data may be transmitted using any suitable communication protocol, such as Hypertext Transfer Protocol (HTTP), Hypertext Transfer Protocol Secure (HTTPS), or File Transfer Protocol (FTP), for example.

In FIG. 1B, the debt trending device 102 is configured to receive financial data associated with users from the financial data device 104, extract account information from the financial data, and provide the account information (as well as other information indicating trends, summaries, etc., of the financial data in various embodiments) to the corresponding user in a format viewable by a user's web browser 196, for example. The description below should be interpreted to include use of the debt trending module in either the debt trending device 102 and/or the computing device 190, regardless of the specific location of the debt trending module 198 within the description. Thus, any embodiment described herein may be implemented by debt trending analysis that is performed by the debt trending device 102, an end-user computing device such as the computing device 190, or another suitable computing device.

Figure 2:
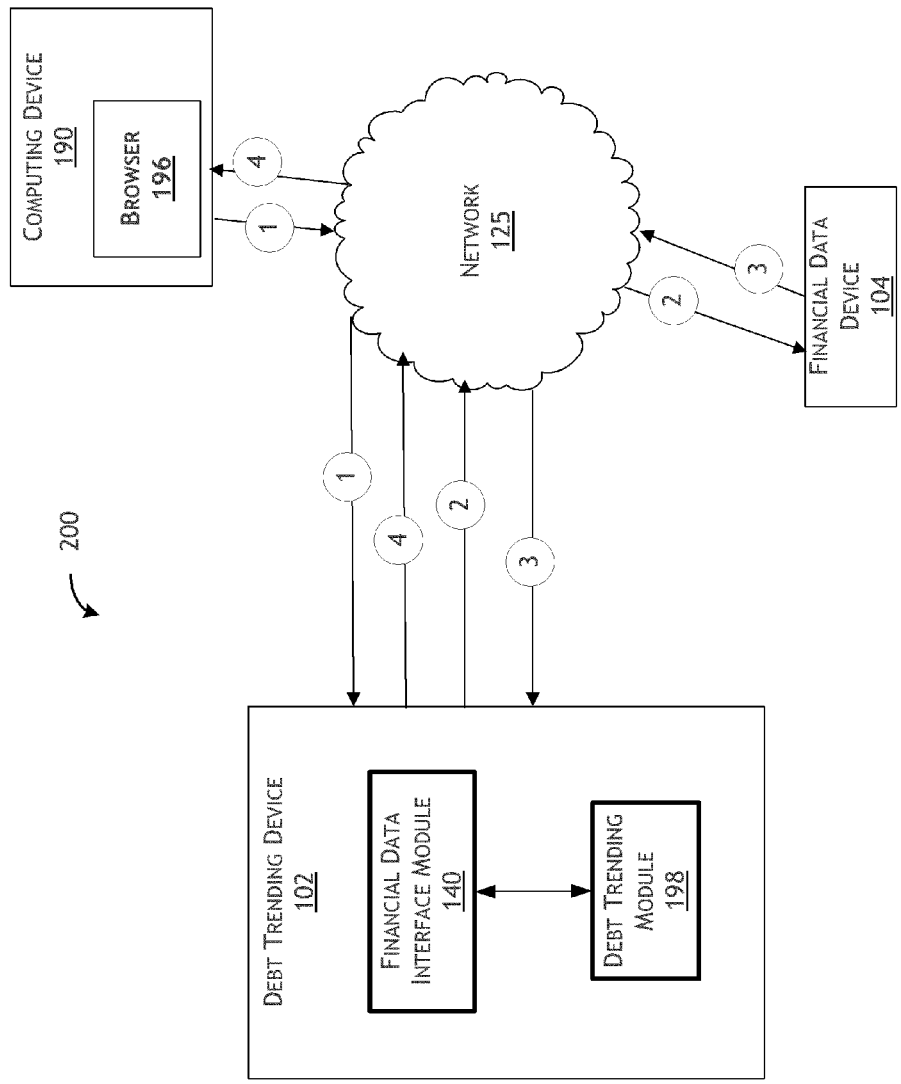
FIG. 2 is a block diagram illustrating one embodiment of a debt trending device in communication with a user computing device.

FIG. 2 is a block diagram illustrating one embodiment of the debt trending device 102 in communication with a user computing device 190. FIG. 2 illustrates an exemplary data flow between the computing device 190, the debt trending device 102, and a financial data device 104 that results in providing debt trending information, such as trending, debt analysis, and/or financial account information, to a user requesting analysis of their private/personal debt. In particular, the circled numerals of FIG. 2 correspond with a an exemplary method of providing debt trending information, which is described in further detail below. Those skilled in the art will recognize that that data flow illustrated in FIG. 2 may be adapted to provide debt trending information to a user via a software application comprising the debt trending module 198, or an adaptation thereof, executing on the computing device 190.

Beginning at step 1 of FIG. 2, the user's computing device 190 executes a web browser 196 in order to access a debt trending module 198, such as to request debt trending information from the debt trending device 102. In one embodiment, the user completes an enrollment form, such as by providing information via one or more user interfaces that are accessed via the browser 196, that allows the user to receive debt trending information that is immediately available and/or or available at predetermined intervals in the future.

In step 2, upon receipt of the request and possibly confirming enrollment of the user in a debt trending analysis service and/or payment of a one-time and/or recurring membership fee, certain user information is transmitted to the financial data device 104, such as by sending a request through the network 125 to the financial data device 104, with a request for financial information regarding the user, such as a credit report. The user information that is transmitted to the financial data device 104 may including any user information that is helpful and/or necessary for the financial data device 104 to identify the user and locate financial data associated with the user. In one embodiment, the user information transmitted to the financial data device 104 includes one or more of a first name, last name, address, social security number, other identification number, address, and/or other identification information. In one embodiment, the financial data device 104 stores and/or has access to financial data regarding a plurality of users from one or more credit bureaus. In one embodiment, the debt trending device 102 communicates with multiple financial data devices 104 that comprise financial data from different credit bureaus and/or other entities that collect and/or or sell financial information.

In step 3, in response to receiving the request, the financial data device 104 transmits the requested financial data to the debt trending device 102. Depending on the embodiment, payment for the financial data may occur, if at all, prior to or after transmission of the financial data to the debt trending device 102.

In step 4 of FIG. 2, the financial data interface module 140 analyzes the received financial data and extracts financial account data from the data. In one embodiment, the user establishes rules indicating which accounts the user is interested in including in debt trending information that is generated by the debt trending device 102. For example, a first user may indicate that only credit card accounts should be found, while another user may indicate that all open accounts with an outstanding balance should be found. In other embodiments, rules based on any other attributes associated with financial accounts may be established by the user. After the financial data interface module 140 has located one or more financial accounts in the returned financial data, the financial data interface module 140 may format the located account information for use by the debt trending module 198. Finally, the debt trending module 198 analyzes the account data and provides debt trending information in various formats, such as one or more user interfaces, e.g., comprising charts, graphs, lists, etc., to the user via the browser 196. In other embodiments, a single or multiple modules perform the methods described herein with respect to the financial data interface module and/or debt trending module.

Figure 3:
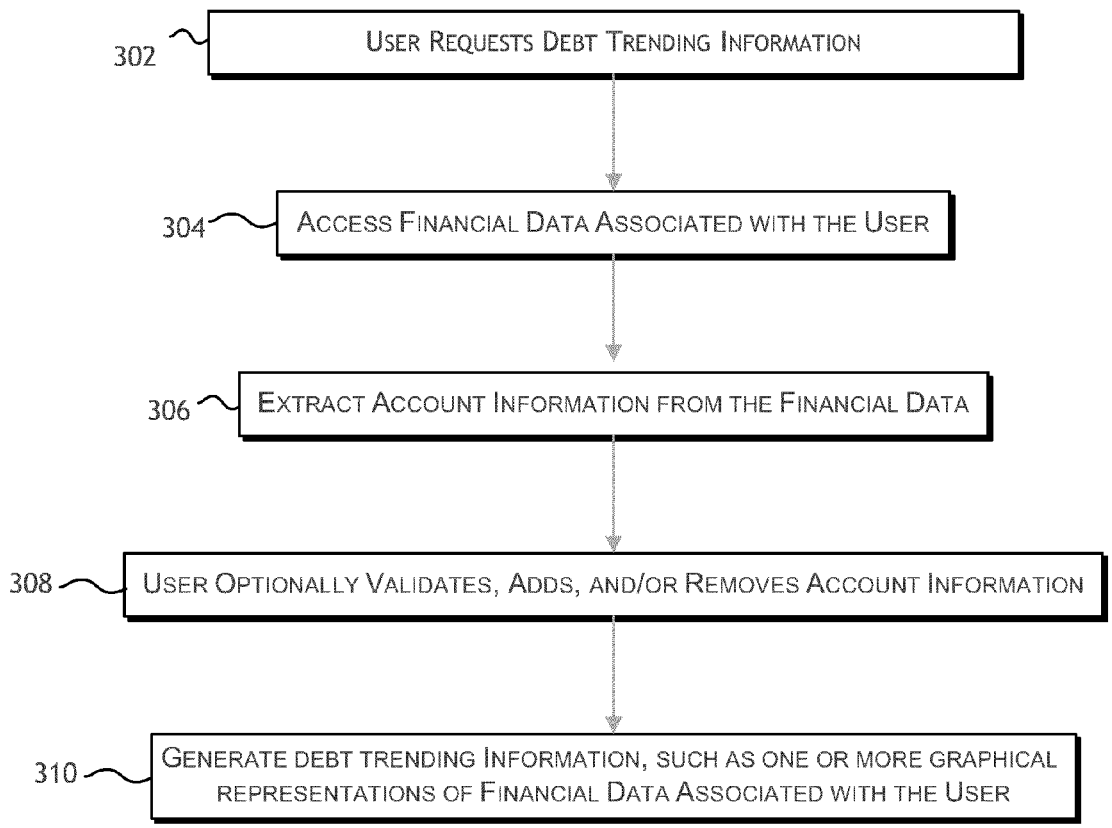
FIG. 3 is a flowchart illustrating one embodiment of a method for providing a debt trending analysis.

FIG. 3 is a flowchart illustrating one embodiment of a method for providing debt trending information to a user. Depending on the embodiment, the method of FIG. 3 may include fewer or additional blocks and the blocks may be performed in a different order than is illustrated.

In block 302, a user requests debt trending information, such as from the debt trending device 102. In one embodiment, the user may utilize a web browser 196 executing on a computing device 190 to submit a request to retrieve the debt trending information. In another embodiment, the user may utilize a debt trending module 198 executing on a computing device 190 (e.g., FIGS. 1A and 1B) to submit a request to retrieve the debt trending information. In one embodiment, the user may provide personally identifiable information ("PII") to the debt trending module 198, such as in order for the user to log into an account with the debt trending module 198 and/or to be used by the debt trending module 198 in identifying the user to one or more financial data devices from which financial data may be requested.

In one embodiment, the PII provided by the user comprises a social security number, both a name and address, or any other combination of user information, that might be used to access debt trending information from the debt trending device 102 and/or initiate retrieve of financial data from one or more financial data devices 104. In other embodiments, other PII, such as birth date, spouse information, etc., may be requested by the debt trending module 198 and used by the debt trending device 102 in acquiring financial data associated with the user.

In block 304, the debt trending device 102 accesses financial data associated with the user from at least one financial data device 104. For example, a credit report of a consumer may be transmitted to the debt trending device 102. In one embodiment, the financial data device 104 receives credit-related information from a plurality of financial institutions, such as banks, lenders, brokerage firms, credit card companies, and other entities.

In block 306, the debt trending device 102 extracts account information from the financial data. For example, the financial data interface module 140 may scan one or more documents received from the financial data device 104, such as one or more credit reports, in order to locate account information that is included in the documents. The account information, including information regarding debts of the user, may be located in the documents of the financial data device 104 using any suitable methods, such as extracting data from certain fields of the documents, applying regular expressions or other search strings to the documents, and/or any other method.

Next, in block 308 the user may be given an opportunity to validate, add, and/or remove account information. For example, a user interface displaying financial accounts located by the device 102 (and corresponding debit information associated with the financial accounts) may be provided to the user and the user may be given an opportunity to remove, add, or adjust the indicated financial accounts. For example, the user may want to add a private debt, such as a personal loan to a friend or family member, so that it is included in the analysis of the account information in generating the debt trending information. Account information may be added and/or removed from the user account via various user interfaces and control objects, such as those that might be displayed to users via one or more user interfaces.

In one embodiment, duplicate account information may be removed automatically by the debt trending device 102 so that financial accounts appearing on multiple credit reports, or multiple times on a single credit report, may only be included once in the information that is analyzed in generating the debt trending information and may be displayed only once (possibly with an indication that a duplicate account was removed from the listing) in aggregated account summary provided by the debt trending module 198. In one embodiment, the financial data device 104 and/or the debt trending device 102 may provide account de-dupe functionality. Similarly, the user may be allowed to manually remove duplicate account information associated with duplicate accounts that may include different account numbers/names associated with duplicate accounts.

In block 308, the debt trending module 198 applies one or more models and/or performs one or more debt trend calculations in order to determine debt trend information for the user. The debt trending module 198 may also generate one or more graphical representations of the debt trend information for presentation to the user. For example, one or more user interfaces may includes an overall account summary of the user's financial portfolio, including, present and future debt payment values and overall debt trending analysis. In one embodiment, outstanding debt account information may be more transparent to the user as displayed in user interfaces comprising graphs, tables, charts, lists, and/or other useful formats that highlight debt trending information associated with the user.

In one embodiment, the debt trending module 198 may provide interest rates corresponding to respective financial account so that interest payments may be calculated and analyzed. For example, manual entry of interest rates may be supported. Computation of interest payment amounts may be used to assist the user in forecasting account balance payoff dates more accurately. Also, the debt trending module may provide projections of payoff dates for certain accounts, provided a monthly payment estimate and/or based on a minimum monthly payment. In one embodiment, the debt trending module may provide monthly payment estimates given target payoff dates for one or more credit accounts.

Figure 4:
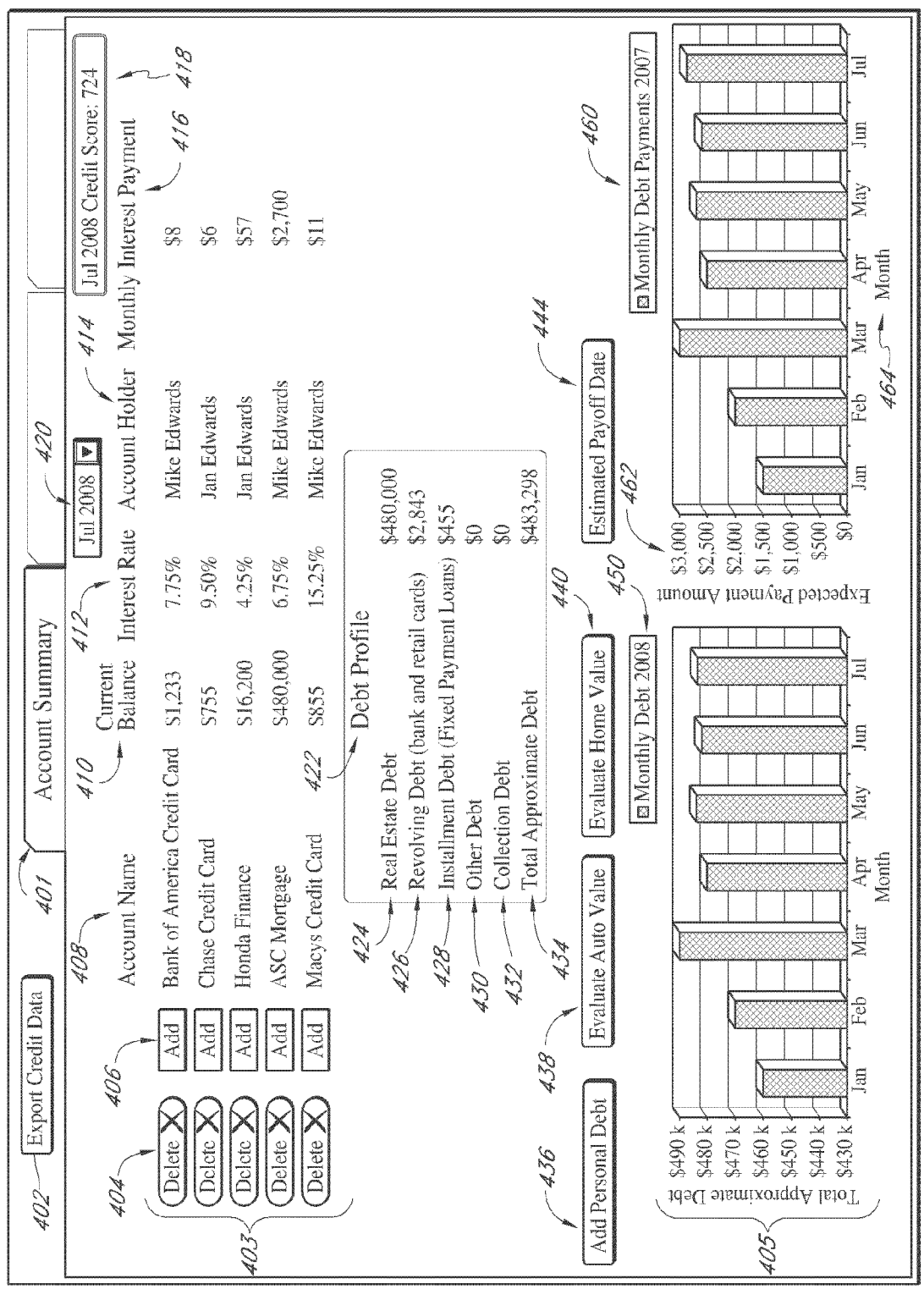
FIG. 4 illustrates an exemplary user interface that may be provided by the debt trending device.

FIG. 4 illustrates an exemplary user interface that may be provided by the debt trending device 102. The exemplary account summary interface 401 includes information regarding a plurality of financial accounts 403, a debt profile pane 422, and debt trending charts 405 that are associated with financial information of a user that has requested debt trending information. A user interface similar to the user account summary interface 401 may be generated by the debt trending module 198 via a web browser or by the debt trending module 198 installed on the consumer's computing device. Depending on the embodiment, user interfaces based on and/or reflecting different aspects of the financial data associated with a user may include any subset of the information illustrated in FIG. 4, possibly in varying types of charts, graphs, tables, lists, etc., and/or may include additional information that is not illustrated in FIG. 4.

The exemplary user interface of FIG. 4, which is displayed in response to the user selecting the account summary tab 401 in this embodiment, includes information regarding multiple financial accounts, including account names 408, current balances 410, interest rates 412, account holder information 414, and monthly interest payments 416 for each listed account. As illustrated in the account holder information 414 column of the user interface, account information associated with two users is displayed and merged into one account summary report. In another embodiment, the account summary interface may display account data for only one user or for additional related users. In one embodiment, the financial account details are auto-populated from the account information that is extracted from the financial information received from one or more financial data device 104, e.g., credit report(s) provided by a credit bureau.

In one embodiment, through the use of the personal debt entry button 436, a user may enter information pertaining to a personal debt and/or other debt that was not identified by the debt trending module in the financial data. For example, in response to selecting the add personal debt entry button 436, a user may be provided with a user interface that allows entry of information associated with personal debt, such as personal loans owed to family/friends, for inclusion in the account information of the user. Accordingly, debt information provided by the user via the button 436 and a corresponding user interface, for example, may be included in the list of account 403 and included in the data analyzed in order to generate to the debt trending module 198.

In one embodiment, a user may add or delete account details using the respective add and delete buttons 406, 404. In one embodiment, by selecting the add button 406 associated with a particular account, a user may add and/or edit one or more account details of a financial account so that new or updated account details are used in computation of the debt trending information for the user. For example, an incorrect (possibly outdated) interest rate, current balance, etc., may be updated by the user so that the debt trending information more accurately reflects the debt position of the user. In another embodiment, a user may delete an account used in the computation of the debt trending information by selecting a delete button 404 associated with a financial account to be deleted.

In one embodiment, an individual credit score 418 may be retrieved and provided in the account summary interface 401. The debt trending module 198 may provide an individual's personal credit score 418 or may reflect a combination credit score associated with more than one user, such as an average or weighted average of credit scores associated with married spouses. In one embodiment, certain debt trending information is based at least partly on credit scores.

The debt trending module 198 may allow the user to export financial data and/or debt trending information in one or more formats to a remote computing device. In one embodiment, the user account summary interface 401 includes an export credit data button 402 that initiates exportation of financial data, account data, and/or debt trending information, in a variety of different formats to an external memory location or computing device. In one embodiment, the debt trending module 192 is configured to export account data in Quicken Interchange Format (QIF), Comma Separated Values (CSV), and/or any other suitable format.

In one embodiment, the debt trending module 198 is configured to archive historical financial information, such as financial data, account data, and/or debt trending information from previous months. In this embodiment, the debt trending module 198 may allow the user to view past months' financial information by selecting a desired month (or other period), such as by using the drop-down interface 420. In one embodiment, the debt trending module 198 may provide for a method of storing previous month's financial account information for later retrieval.

A monthly debt profile pane 422 may be provided by the debt trending module 198. The exemplary debt profile pane 422 includes information regarding real estate debt 424, revolving debt 426, installment debt 428, other debt 430, collection debt 432, and total approximate debt 434. In other embodiments, other debt information may be include in a debt profile and the debt profile may be embodied in other formats, such as one or more charts, graphs, or tables, for example. In one embodiment, a debt profile may be used to summarize multiple active accounts to provide a categorized summary of a user(s) debt. For example, a chart illustrating the total monthly debt over a period of multiple months (or other periods) may be generated by the debt trending module 198 based on the total approximate debt 434 values for multiple months. In one embodiment, a monthly debt chart includes preceding, present, and expected monthly debt totals, providing an indication of how monthly balances are changing, e.g., if they are increasing or decreasing, and what the overall trend is. Exemplary FIG. 4 includes a sample monthly debt chart 450 that indicates the monthly debt over a period of 7 months. For example, a monthly debt chart may estimate future monthly debt for the user (e.g., the married couple illustrated in FIG. 4) for one or more future months (or other time periods) based on the historical trend in paying the financial accounts.

In the embodiment of FIG. 4, the debt trending information includes a monthly debt payment chart 460 that indicates estimated total monthly debt payments for the user, such as based on the financial data extracted from one or more credit reports associated with the user. In one embodiment, the monthly debt payment chart 460 may include estimates of future monthly debt payments based at least on the historical account payment information, payoff dates, interest rates, and/or other account information, such that the user can plan for changes in monthly debt payments (e.g., payoff of a major debt account).

In one embodiment, the debt trending module 198 may be configured to project the future value of assets such as a home or an automobile and offer buy, sell, or maintain recommendations for the user along with market analysis of the asset's current and future value. In one embodiment, a user may be able to initiate a process of estimating the value of a home, such as using a web interface, e.g. FIG. 6, which may be presented to the user in response to the user selecting a home value estimation button 440. In another embodiment, a user may be able to initiate a process of estimating the value of an automobile 438, such as using a web interface, e.g. FIG. 7, by selecting an automobile value estimation button 438. In other embodiments, other asset evaluation interfaces may be available to the user.

The debt trending module 198 may be configured to estimate a payoff date for at least one debt account. For example, with reference to the exemplary user interface of FIG. 4, a user may be presented with a payoff user interface in response to selecting the payoff date button 444. A payoff interface may indicate a current payoff date for an account, such as based on the current account information extracted from the financial data of the user received from one or more financial data devices, as well as provide one or more estimated payoff dates that are associated with different monthly payments, such as a sample monthly payment provided by the user. In another embodiment, when given a sample payoff date by a user, the debt trending module 198 may estimate the monthly payment necessary to achieve payoff of the account by the sample payoff date. In one embodiment, the debt trending device 102 receives actual account payment information from a financial data device, such as a device associated with a bank where the user holds a checking account from which account payments are made.

In one embodiment, the debt trending module 198 may be able to provide targeted business opportunities based on a user's data, for example, low rate credit cards, fixed rate credit cards, refinancing options, HELOC, credit monitoring and credit counseling.

Figure 5:
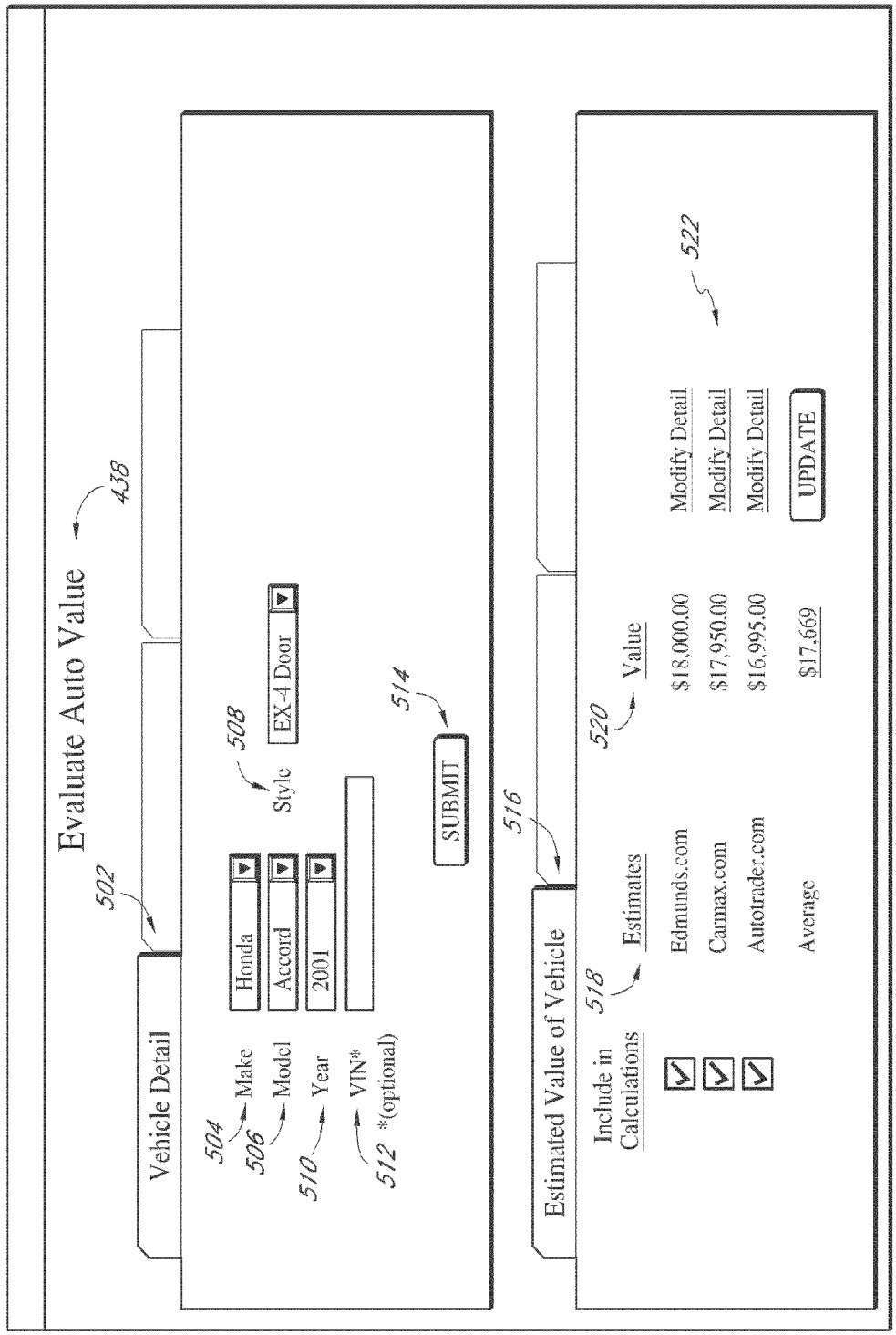
FIG. 5 illustrates an exemplary auto value estimation interface that may be accessible from the debt trending device.

FIG. 5 illustrates an exemplary auto value estimation interface that may be accessible from the device 102. For example, in response to the user selecting the evaluate auto value button 438 of FIG. 4, the debt trending module 198 may provide auto value evaluations to users. In one embodiment, vehicle details may be extracted from financial information from one or more financial data device. For example account information associated with a vehicle loan may indicate vehicle information that is usable to estimate a current and/or future value of the vehicle. In one embodiment, vehicle information may be received from the user via one or more user interfaces, such as in vehicle detail interface 502. The exemplary user interface 502 includes controls, such as drop-down menus or text entry files, for entry of a vehicle's make 504, model 506, style 508, year 510, and vehicle identification number (VIN) 512. In other embodiments, a vehicle detail user interface may include fewer or additional controls in order to receive any other information that might be useful in estimating the value of an automobile.

In one embodiment, upon submission of the vehicle information by the user (and/or after the debt trending module identifies the vehicle information in the financial information received from one or more financial data sources) the debt trending module determines one or more estimated vehicle values. In one embodiment, the vehicle value estimation is based on information from one or more auto sales vendors, such as by transmitting vehicle information to one or more auto data sources, such as one or more web-based auto sales merchants including Edmonds.com, Carmax.com, and Autotrader.com, for example. In the embodiment of FIG. 5, multiple value estimates are provided in column 520 and the user is able to select one or more of the value estimates to be included in the auto value estimate. For example, the user interface of FIG. 5 includes checkboxes that may be selected and deselected by the user in order to indicate which of the value estimates (e.g., from different sources) should be included in the overall value estimation, which may be an average, weighted average, median, or other representation of the selected value estimates.

Figure 6:
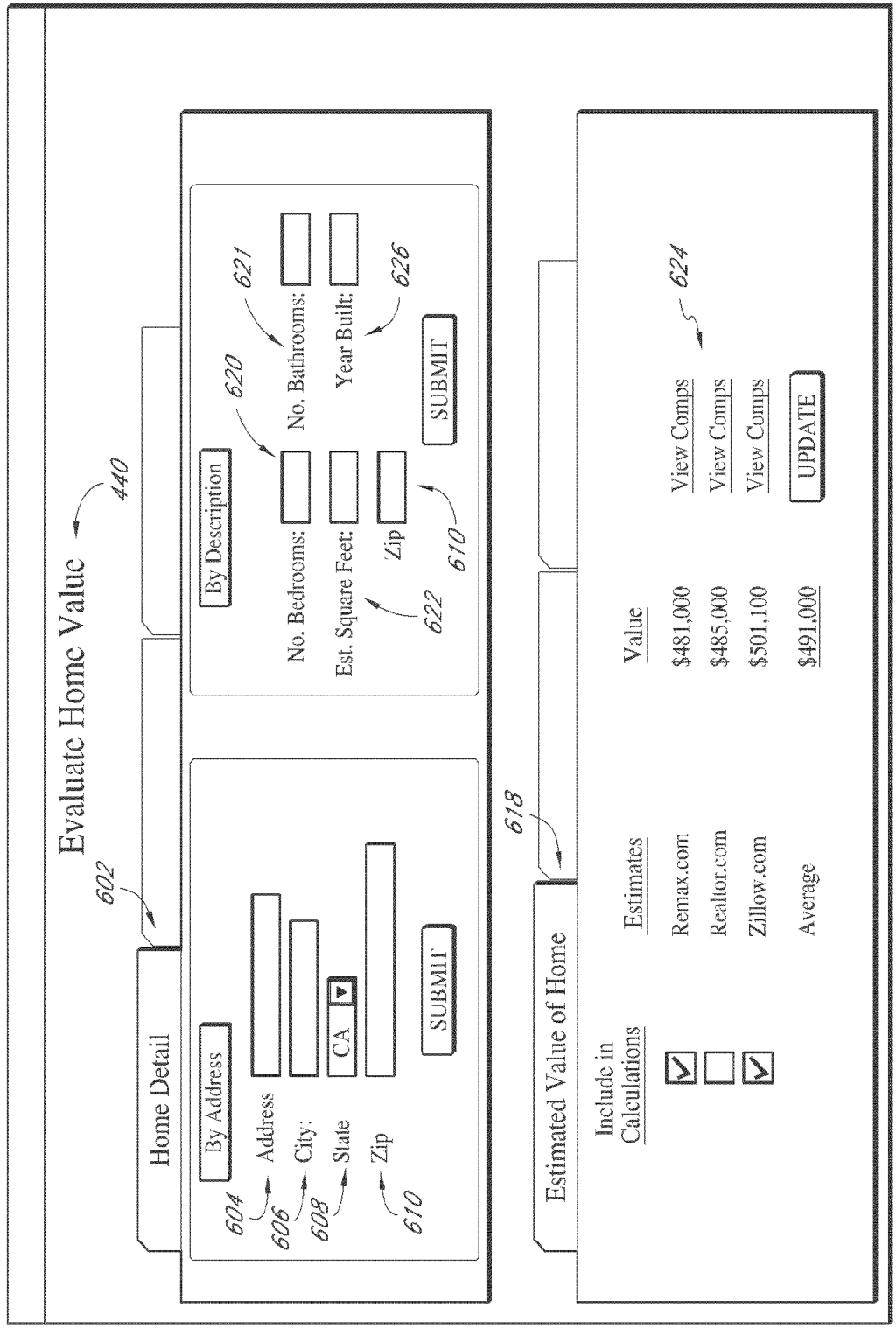
FIG. 6 illustrates an exemplary home value estimation interface that may be accessible from the debt trending device.

FIG. 6 illustrates an exemplary home value estimation interface that may be accessible from the device 102. For example, in response to the user selecting the estimate home value button 440 of FIG. 4, the debt trending module 198 may provides home value estimates to users. In one embodiment, home details may be extracted from financial information from one or more financial data device. For example, account information associated with a home loan or public records may indicate home information that is usable to estimate a current and/or future value of the home. In one embodiment, home information may be received from the user via one or more user interfaces, such as in home detail interface 602. The exemplary user interface 602 includes controls, such as drop-down menus or text entry files, for entry of an address 604, city 606, state 608, zip 610, number of bedrooms 620, number of bathrooms 624, estimated square feet 622, zip 610, and/or year built 626 to describe the asset. In other embodiments, a home detail user interface may include fewer or additional controls in order to receive any other information that might be useful in estimating the value of a home.

In one embodiment, upon submission of the home information by the user (and/or after the debt trending module identifies the home information in the financial information received from one or more financial data sources) the debt trending module determines one or more estimated home values. In one embodiment, the home value estimation is based on information from one or more realtor and/or real estate search sites/services, such as by transmitting home information (e.g., an address) to one or more data sources, such as providers of Edmonds.com, Carmax.com, and/or Autotrader.com, for example. In the embodiment of FIG. 6, multiple home value estimates are provided in the sample user interface of FIG. 6 and the user is able to select one or more of the value estimates to be included in the home value estimate. For example, the user interface of FIG. 6 includes checkboxes that may be selected and deselected by the user in order to indicate which of the home value estimates (e.g., from different sources) should be included in the overall home value estimation, which may be an average, weighted average, median, or other representation of the selected value estimates. The user interface of FIG. 6 additionally includes comps links 625 that, when selected, provide information regarding comparable homes.

Figure 7:
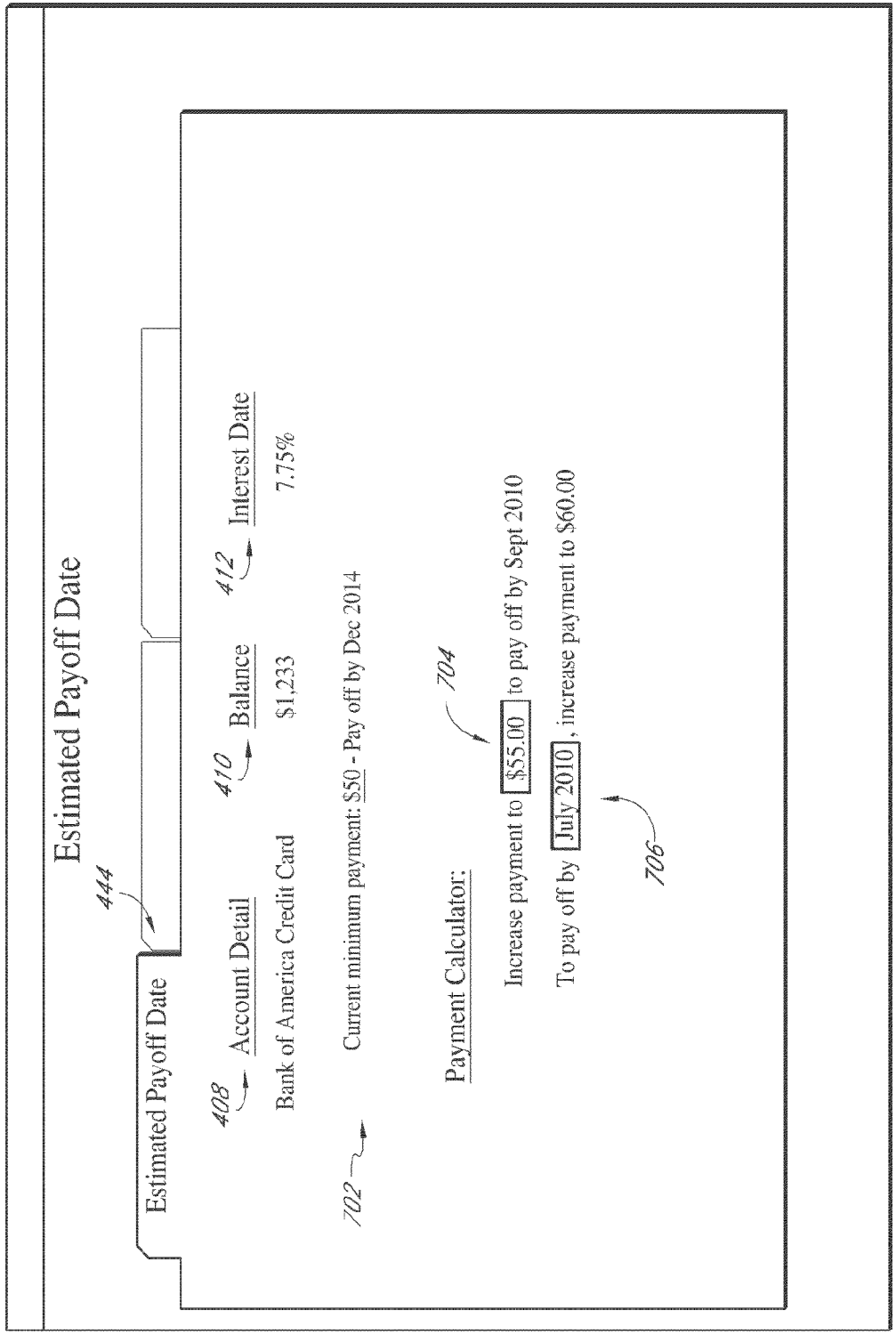
FIG. 7 illustrates an exemplary payoff calculator that may be accessible from the debt trending device.

FIG. 7 illustrates an exemplary payoff calculator user interface 444 that may be accessible from the device 102. In the embodiment of FIG. 7, a default payoff amount may be selected for a single (or multiple) financial account(s). In this embodiment, the user provides a sample payment amount 704 and receives details regarding a payoff date associated with the sample payment amount from the debt trending module 198. In one embodiment, the user may be able to input the payoff date 706 and receive details regarding the payment amount 704 from the debt trending module 198. In one embodiment, changes in the estimated payoff amount and/or estimated payoff dates may be included in the account information for the corresponding accounts such that debt trending information reflecting the estimated changes may be viewed, such as in the various user interfaces of FIG. 4.

Figure 8:
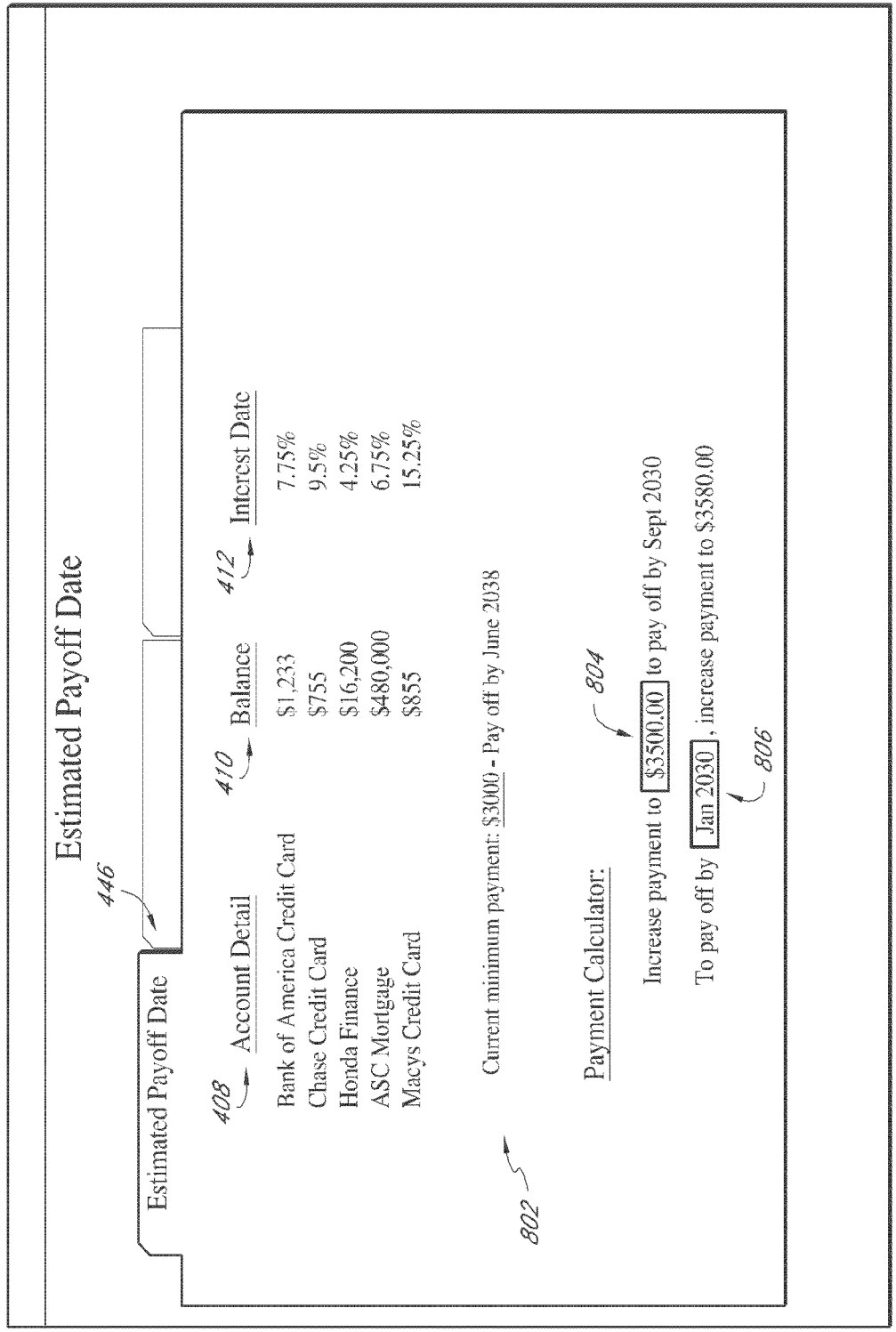
FIG. 8 illustrates an exemplary payoff calculator that may be accessible from the debt trending device.

FIG. 8 illustrates an exemplary payoff calculator 446 that may be accessible from the device 102. In this embodiment, a default payoff amount may be selected to be applied towards multiple financial accounts, each having different payments, maturity dates, interests rates, etc. Advantageously, the data associated with these multiple financial accounts may be retrieved and extracted by the debt trending module 102 without requiring the user to lookup and/or provide the account details. In one embodiment, the estimate payoff date button 460 (FIG. 4), may be selected in order to initiate display of the payoff calculator of FIG. 8. In one embodiment, a default payoff amount may be input to be applied in calculation towards all financial account balances 802. In another embodiment, a user may be able to input the aggregate desired monthly payment 804 in order to receive details regarding the payoff date 806 from the debt trending module 198. In another embodiment, the user may be able to input a desired payoff date 806 and receive details regarding a required total monthly payment amount 804 (e.g., for each of a plurality of debt accounts). In one embodiment, any changes in the estimated payoff amounts or estimated payoff dates of all aggregated accounts may be included in the account information for the corresponding accounts such that debt trending information reflecting the estimated changes may be viewed, such as in the various user interfaces of FIG. 4.

All of the processes described above may be embodied in, and fully automated via, software code modules executed by one or more general purpose computers. The code module may be stored in any type of computer-readable medium or other computer storage device. Some or all of the methods may alternatively be embodied in specialized computer hardware. As will be apparent, the features, and attributes of the specific embodiments disclosed above may be combined in different ways to form additional embodiments, all of which are fall within the scope of the present disclosure. Although this disclosure has been described in terms of certain preferred embodiments and applications, other embodiments and applications that are apparent to those of ordinary skill in the art, including embodiments which do not provide all of the features and advantages set forth herein, are also within the scope of this disclosure. Accordingly, the scope of the disclosure is intended to be defined only by reference to the appended claims.

What is claimed is:

1. A method of providing debt information for a plurality of debt accounts associated with a user, the method comprising:
    receiving consumer information identifying a consumer;
    transmitting at least some of the consumer information to a credit data source that maintains historical credit information for a plurality of consumers;
    receiving credit information associated with the consumer from the credit data source;
    detecting, by a computing device, a plurality of financial accounts in the received credit information;
    for each of the plurality of financial accounts:
        determining, by the computing device, an outstanding balance, a periodic minimum payment amount, and a payoff date;
    determining, by the computing device, a total estimated outstanding balance for the consumer based at least in part on the respective outstanding balances for each of the plurality of financial accounts;
    determining, by the computing device, a total minimum monthly payment amount based at least in part on the respective periodic minimum payment amounts and payoff dates for each of the plurality of financial accounts;
    receiving a selected payoff date from the consumer indicating when the consumer would like to have all of the plurality of financial accounts paid in full; and
    determining a total periodic payment amount indicating an amount the consumer must pay on a periodic basis toward the plurality of financial accounts to pay off all of the plurality of financial accounts by the selected payoff date, the total periodic payment amount determined based on at least
        the total estimated outstanding balance,
        the total minimum monthly payment amount,
        the selected payoff date, and
        the payoff dates associated with each of the plurality of financial accounts.

2. The method of claim 1 further comprising:
    generating, by the computing device, an output user interface displaying the total periodic payment amount.

3. The method of claim 1 wherein the selected payoff date is received via an input user interface generated by the computing device.

4. The method of claim 1 further comprising:
    receiving, from the consumer, consumer provided credit information, the consumer provided credit information comprising at least one additional financial account that is not among the plurality of financial accounts in the received credit information;
    wherein the account information further comprises one or more of an outstanding balance, a periodic minimum payment amount, an interest rate, and a payoff date of the at least one additional financial account, and
    wherein the total periodic payment amount further indicates an amount the consumer must pay on a periodic basis to pay off both the plurality of financial accounts in the received credit information and the at least one additional financial account.

5. The method of claim 1 further comprising:
    receiving validation information from the consumer indicating whether the determined account information of the plurality of financial accounts is correct.

6. The method of claim 1 further comprising:
    providing, by the computing device, a selection user interface allowing the consumer to select one or more of the plurality of financial accounts;
    wherein the total estimated outstanding balance, the total minimum monthly payment amount, and the total periodic payment amount are determined based on the selected one or more of the plurality of financial accounts.

7. A method of providing debt information for a plurality of debt accounts associated with a user, the method comprising:
    receiving consumer information identifying a consumer;
    transmitting at least some of the consumer information to a credit data source that maintains historical credit information for a plurality of consumers;
    receiving credit information associated with the consumer from the credit data source;
    detecting, by a computing device, a plurality of financial accounts in the received credit information;
    for each of the plurality of financial accounts:
        determining, by the computing device, an outstanding balance, a periodic minimum payment amount, and a payoff date;
    determining, by the computing device, a total estimated outstanding balance for the consumer based at least in part on the respective determined outstanding balances for at least two of the plurality of financial accounts;
    determining, by the computing device, a total minimum monthly payment amount based at least based at least in part on the respective determined periodic minimum payment amounts and payoff dates for at least two of the plurality of financial accounts;
    receiving a selected periodic payment amount from the consumer indicating the amount consumer would like pay toward the detected plurality of financial accounts; and determining an estimated pay-off date indicating the date when all of the detected plurality of financial accounts are likely to be paid in full, the estimated pay-off date determined based on at least the total estimated outstanding balance, the total minimum monthly payment amount, the selected periodic payment amount, and the payoff date associated with each of the plurality of financial accounts.

8. The method of claim 7 further comprising:

generating, by the computing device, an output user interface displaying the estimated pay-off date.

9. The method of claim 7 wherein the selected periodic payment amount is received from an input user interface generated by the computing device.

10. The method of claim 7 further comprising:

receiving, from the consumer, consumer provided credit information, the consumer provided credit information comprising at least one additional financial account that is not among the plurality of financial accounts in the received credit information;

wherein the account information further comprises one or more of an outstanding balance, a periodic minimum payment amount, and a payoff date of the at least one additional financial account, and wherein the estimated pay-off date further indicates when the plurality of financial accounts in the received credit information and the at least one additional financial accounts are likely to be paid in full.

11. The method of claim 7 further comprising:

receiving validation information from the consumer indicating whether the determined account information of the plurality of financial accounts in the received credit information is correct.

12. The method of claim 7 further comprising:

providing, by the computing device, a selection user interface allowing the consumer to select one or more of the plurality of financial accounts;

wherein the total estimated outstanding balance, the total minimum monthly payment amount, and estimated pay-off date are determined based on the selected one or more of the plurality of financial accounts.

13. A system for providing debt information for a plurality of debt accounts associated with a user, the system comprising:

a processor;

a non-transitory, tangible computer readable medium storing software instructions configured for execution by the processor, the instructions configured to cause the system to:

receive consumer information identifying a consumer;

access credit information associated with the consumer from a credit data source;

detect financial accounts in the accessed credit information;

for each of the detected financial accounts:

determine an outstanding balance, a periodic minimum payment amount, and a payoff date;

determine a total estimated outstanding balance for the consumer based at least in part on the respective determined outstanding balances for each of the detected financial accounts;

determine a total minimum monthly payment amount based at least in part on the respective determined periodic minimum payment amounts and payoff dates for each of the detected financial accounts;

receive a selected payoff date from the consumer indicating when the consumer would like to have each of the one or more financial accounts paid in full; and determine a total monthly payment amount indicating an amount the consumer must pay toward the determined financial accounts to pay off all of the detected financial accounts by the selected payoff date, the total monthly payment amount determined based on at least the total estimated outstanding balance, the total minimum monthly payment amount, the selected payoff date, and the payoff date associated with each of the detected financial accounts.

14. The system of claim 13 wherein the instructions further cause the processor to:

generate an output user interface displaying the total monthly payment amount.

15. The system of claim 13 wherein the selected payoff date is received via an input user interface generated by the processor based on instructions stored in the non-transitory, tangible computer readable medium.

16. The system of claim 13 wherein the instructions further cause the processor to:

receive, from the consumer, consumer provided credit information, the consumer provided credit information comprising at least one additional financial account that is not among the plurality of financial accounts in the received credit information; and, wherein the account information further comprises one or more of an outstanding balance, a periodic minimum payment amount, an interest rate, and a payoff date of the at least one additional financial account, and wherein the total monthly payment amount further indicates an amount the consumer must pay per month to pay off both the plurality of financial accounts in the received credit information and the at least one additional financial account.

17. The system of claim 13 wherein the instructions further cause the processor to:

receive validation information from the consumer indicating whether the determined account information of the plurality of financial accounts is correct.

18. The system of claim 13 wherein the instructions further cause the processor to:

provide a selection user interface allowing the consumer to select one or more selected financial accounts of the plurality of financial accounts, and wherein the total estimated outstanding balance, the total minimum monthly payment amount, and the total periodic payment amount are determined based on the selected one or more of the plurality of financial accounts.

19. A system for providing debt information for a plurality of debt accounts associated with a user, the system comprising:

a processor;

a non-transitory, tangible computer readable medium storing software instructions configured for execution by the processor, the instructions causing the processor to:

receive consumer information identifying a consumer;

access credit information associated with the consumer from a credit data source;

detect a plurality of financial accounts in the accessed credit information;

for at least two of the detected financial accounts:
- determine an outstanding balance, a periodic minimum payment amount, and a payoff date;
- determine a total estimated outstanding balance for the consumer based at least in part on the determined outstanding balances for the at least two detected financial accounts;
- determine a total minimum monthly payment amount based at least in part on the determined periodic minimum payment amounts and payoff dates for the at least two detected financial accounts;
- receive a selected periodic payment amount indicating the amount consumer would like pay toward the at least two of the plurality of financial accounts; and
- determine an estimated pay-off date indicating the date when all of the at least two of the plurality financial accounts are likely to be paid in full, the estimated pay-off date determined based on at least
  - the total estimated outstanding balance,
  - the total minimum monthly payment amount,
  - the selected periodic payment amount, and
  - the payoff date associated with each of the plurality of financial accounts.

20. The system of claim 19 wherein the instructions further cause the processor to:
generate an output user interface displaying the estimated pay-off date.

21. The system of claim 19 wherein the selected periodic payment amount is received via an input user interface generated by the processor based on instructions stored in the non-transitory, tangible computer readable medium.

22. The system of claim 19 wherein the instructions further cause the processor to:
- receive, from the consumer, consumer provided credit information, the consumer provided credit information comprising at least one additional financial account that is not among the plurality of financial accounts in the received credit information;
- wherein the account information further comprises one or more of an outstanding balance, a periodic minimum payment amount, an interest rate, and a payoff date of the at least one additional financial account, and
- wherein the estimated pay-off date further indicates when plurality of financial accounts in the received credit information and the at least one additional financial accounts are likely to be paid in full.

23. The system of claim 19 wherein the instructions further cause the processor to:
receiving validation information from the consumer indicating whether the determined account information of the plurality of financial accounts in the received credit information is correct.

24. The system of claim 19 wherein the instructions further cause the processor to:
- provide a selection user interface allowing the consumer to select one or more selected financial accounts of the plurality of financial accounts, and
- wherein the total estimated outstanding balance, the total minimum monthly payment amount, and estimated pay-off date are determined based on the selected one or more of the plurality of financial accounts.

* * * * *

UNITED STATES PATENT AND TRADEMARK OFFICE
CERTIFICATE OF CORRECTION

PATENT NO.        : 8,930,251 B2                                          Page 1 of 1
APPLICATION NO.   : 13/345319
DATED             : January 6, 2015
INVENTOR(S)       : Tod DeBie It is certified that error appears in the above-identified patent and that said Letters Patent is hereby corrected as shown below:

References Cited

In column 2 (page 3, item 56) at line 34, Under Other Publications, change "Arlene" to --Arlena--.

In the specification

In column 5 at line 33, Change "indentify" to --identify--.

In column 5 at line 66, Change "eXtendible" to --eXtensible--.

In column 6 at line 29, Change "a an" to --an--.

In column 6 at line 32, Change "that that" to --that--.

In column 8 at line 46, Change "includes" to --include--.

In column 12 at line 5, Change "provides" to --provide--.

In the claims

In column 14 at line 21, In Claim 4, after "amount," delete "an interest rate,".

In column 14 at line 60, In Claim 7, before "in" delete "based at least".

In column 14 at line 65, In Claim 7, after "like" insert --to--.

In column 17 at line 13, In Claim 19, after "like" insert --to--.

In column 17 at line 16, In Claim 19, after "plurality" insert --of--.

Signed and Sealed this
Tenth Day of November, 2015

Michelle K. Lee
*Director of the United States Patent and Trademark Office*